US011440856B2

(12) United States Patent
Owusu-Adom et al.

(10) Patent No.: US 11,440,856 B2
(45) Date of Patent: Sep. 13, 2022

(54) CONTROLLED-RELEASE FERTILIZER COMPOSITIONS

(71) Applicant: OMS Investments, Inc., Los Angeles, CA (US)

(72) Inventors: Kwame Owusu-Adom, Delaware, OH (US); Christian Baldwin, Dublin, OH (US)

(73) Assignee: OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 16/893,360

(22) Filed: Jun. 4, 2020

(65) Prior Publication Data
US 2020/0385319 A1 Dec. 10, 2020

Related U.S. Application Data

(60) Provisional application No. 62/857,498, filed on Jun. 5, 2019.

(51) Int. Cl.
C05G 3/40 (2020.01)
C05G 5/12 (2020.01)
C05G 5/30 (2020.01)
C05G 3/60 (2020.01)
C05C 9/00 (2006.01)
A01C 21/00 (2006.01)
A01M 9/00 (2006.01)

(52) U.S. Cl.
CPC ............... C05G 3/44 (2020.02); A01C 21/00 (2013.01); C05C 9/005 (2013.01); C05G 3/60 (2020.02); C05G 5/12 (2020.02); C05G 5/37 (2020.02); C05G 5/38 (2020.02); A01M 9/00 (2013.01)

(58) Field of Classification Search
None
See application file for complete search history.

(56) References Cited

U.S. PATENT DOCUMENTS

| 3,264,089 | A | * | 8/1966 | Hansen | C05G 3/44 71/64.11 |
|---|---|---|---|---|---|
| 2003/0089150 | A1 | * | 5/2003 | Markusch | C08G 18/48 71/1 |
| 2003/0220200 | A1 | * | 11/2003 | Wertz | C05C 9/02 504/327 |
| 2005/0066697 | A1 | * | 3/2005 | Cline | C05G 5/37 71/28 |
| 2005/0076687 | A1 | * | 4/2005 | Whittington | C05G 5/12 71/64.07 |
| 2006/0222735 | A1 | * | 10/2006 | Rosenthal | C05G 5/37 426/28 |
| 2010/0004124 | A1 | * | 1/2010 | Taft | A01N 25/26 504/100 |
| 2013/0042659 | A1 | * | 2/2013 | Beatty | C05C 9/005 71/64.02 |
| 2013/0305797 | A1 | * | 11/2013 | Neff | C05C 9/00 71/30 |
| 2014/0260470 | A1 | * | 9/2014 | Taulbee | C05G 1/00 71/30 |
| 2014/0290319 | A1 | * | 10/2014 | Poo Palam | C05F 11/00 71/23 |
| 2015/0291481 | A1 | * | 10/2015 | Neff | C09D 175/04 504/347 |
| 2019/0276376 | A1 | * | 9/2019 | Schneider | A01C 21/00 |
| 2020/0031728 | A1 | * | 1/2020 | Adhikari | C05G 5/45 |

* cited by examiner

Primary Examiner — Wayne A Langel
(74) Attorney, Agent, or Firm — Ulmer & Berne LLP

(57) ABSTRACT

A controlled-release fertilizer composition includes coated fertilizer particles having granules substantially encapsulated with a polyurethane coating layer formed from a polyol composition and an isocyanate curing agent. The polyurethane coating layers include inorganic particles. Methods of making and using the controlled-release fertilizer compositions are also disclosed.

20 Claims, No Drawings

CONTROLLED-RELEASE FERTILIZER COMPOSITIONS

CROSS-REFERENCE TO RELATED APPLICATIONS

The present application claims the priority benefit of U.S. Provisional Patent App. Ser. No. 62/857,498, entitled CONTROLLED-RELEASE FERTILIZER COMPOSITIONS, filed Jun. 5, 2019, and hereby incorporates the same application herein by reference in its entirety.

TECHNICAL FIELD

The present disclosure relates generally to the inclusion of inorganic particles in polyurethane coatings of fertilizer particles. The fertilizer particles form controlled-release fertilizer compositions.

BACKGROUND

Controlled-release fertilizers offer a number of benefits compared to conventional fertilizers. For example, controlled-release fertilizers can provide an extended release of nutrients, minimize leaching of nutrients into the ground, and minimize the number of fertilizer applications required for optimal plant growth. One method of forming a controlled-release fertilizer is the encapsulation of granules with a barrier layer to form coated fertilizer particles. However, known encapsulating processes suffer from a number of drawbacks including the need for relatively thick coatings, poor nutrient release characteristics, and time-intensive manufacturing processes.

SUMMARY

According to one embodiment, a controlled-release fertilizer composition includes coated fertilizer particles each include a granule and one or more polyurethane coating layers. The one or more polyurethane coating layers substantially encapsulate the granule and are formed from the reaction product of a polyol composition and an isocyanate curing agent. The one or more polyurethane coating layers include inorganic particles.

According to another embodiment, a method of making a controlled-release fertilizer composition includes coating granules with a polyol composition, dispersing inorganic particles onto the polyol composition, and applying an isocyanate curing agent to the polyol composition to form a polyurethane coating layer substantially encapsulating each granule. The polyol composition is miscible with the isocyanate curing agent.

According to another embodiment, a method of making a controlled-release fertilizer composition includes coating granules with an isocyanate curing agent composition, dispersing inorganic particles onto the isocyanate curing agent composition, and applying a polyol composition to the isocyanate curing agent composition to form a polyurethane coating layer substantially encapsulating each granule. The polyol composition is miscible with the isocyanate curing agent.

According to another embodiment, a method of making a controlled-release fertilizer composition includes coating granules with a polyol composition, applying an isocyanate curing agent to the polyol composition to form a polyurethane coating layer substantially encapsulating each granule, and dispersing inorganic particles onto the polyurethane coating layer before polymerization of the polyol composition and the isocyanate curing agent is complete. The polyol composition is miscible with the isocyanate curing agent.

DETAILED DESCRIPTION

Polyurethane coatings can be applied to granules to substantially encapsulate the granules and extend the release of fertilizer over an extended duration of time. Known polyurethane coatings, formed from the reaction of at least a polyol and an isocyanate curing agent, suffer from a number of undesirable attributes including poor durability, high coating weights, and time-intensive manufacturing processes.

The present disclosure generally describes methods of forming coated fertilizer particles for a controlled-release fertilizer composition which include inorganic particles in the polyurethane coatings. The inclusion of the inorganic particles can improve manufacturing of the coated fertilizer particles, improve the nutrient release profile of the coated fertilizer particles, and decrease the coating weight of the polyurethane coating.

The inclusion of suitable inorganic particles in the polyurethane coatings can improve these characteristics by increasing the polyurethane coating's abrasion resistance, impact resistance, and by lowering the rate of moisture diffusion. Additionally, the inclusion of inorganic particles can also decrease the manufacturing time necessary to form a polyurethane coating.

As may be appreciated however, the addition of inorganic particles to a polyurethane coating can cause, or lead to, several difficulties. For example, the addition of certain inorganic particles can require the unpolymerized polyurethane components (e.g., polyol and isocyanate curing agents) to include additional additives to stabilize the composition before polymerization. Additionally, certain inorganic particles, such as those having certain dimensions, can also cause the viscosity of the unpolymerized polyurethane components to increase substantially. Such viscosity increases can make processing and manufacturing of a controlled-release fertilizer composition more difficult.

Several methods of overcoming these difficulties have been discovered. For example, suitable combinations of inorganic particles and polyols have been discovered which do not require additional additives for stability. Additionally, manufacturing processes have been developed that obviate, or minimize, the difficulties caused by including inorganic particles in the starting components of a polyurethane coating.

For example, in certain embodiments, it has been unexpectedly discovered that polyurethane coatings formed from a mixture of polyols and isocyanate curing agents can include any of a variety of common inorganic particles such as clay, fumed silica, and calcium carbonate without the inclusion of additives or other stabilizers. In certain embodiments, additional examples of suitable inorganic particles for such combinations of polyols and isocyanate curing agents can include quartz, aluminum oxide, mica, calcined kaolin, wollastonite, calcite, zirconia, zircon, micaceous iron oxide, iron oxide, aluminum silicates, talc (sometimes referred to as hydrated magnesium silicate), barium sulfate, lithopone, and combinations thereof.

In such embodiments, the inorganic particles can generally be of any suitable average particle size. For example, in certain embodiments, suitable inorganic particles can have an average particle size of about 50 microns or less, in certain embodiments, about 20 microns or less, and in certain embodiments, about 5 microns or less. As can be appreciated, inorganic particles having a smaller average particle size can lead to a greater increase in viscosity than inorganic particles having a larger average particle size. To minimize increases in viscosity and, as a consequence, manufacturing and processing difficulties, it can be desirable to select inorganic particles having a smaller average particle size.

It has been further unexpectedly discovered that only small quantities of inorganic particles need to be included in a polyurethane coating to enhance the properties of the coating. For example, in various embodiments, inorganic particles can be included, by weight, at quantities of about 1% or less of the polyurethane coating, at about 0.5% or less of the polyurethane coating, at about 0.3% or less of the polyurethane coating, at about 0.2% or less of the polyurethane coating, at about 0.1% or less of the polyurethane coating, at about 0.05% or less of the polyurethane coating, and at about 0.01% of the polyurethane coating. As can be appreciated, the inclusion of inorganic particles in such small quantities can be advantageous because it can minimize the likelihood of any incompatibility of the inorganic particles with the polyurethane components and can minimize any increase in viscosity caused by the inclusion of the inorganic particles.

It has been further discovered that various manufacturing processes can aid in the formation of desirable controlled-release fertilizer compositions. For example, it has been discovered that inorganic particles can advantageously be incorporated into a polyurethane coating substantially surrounding a granule by adding the inorganic particles in a manner which requires no mixing. In these examples, a granule can be encapsulated by applying a polyol composition around the granule, dispersing the inorganic particles onto the polyol composition, and then finally adding the isocyanate curing agent. As can be appreciated, such application of the inorganic particles can substantially obviate any processing concerns caused by the inorganic particles increasing the viscosity of the unpolymerized polyurethane components. Additionally, such inclusion of the inorganic particles can ensure good mixing while minimizing compatibility issues.

Other advantageous manufacturing processes have been further developed. For example, it has been discovered that in embodiments wherein a granule is encapsulated by multiple coating layers, the inclusion of inorganic particles in only certain layers can result in desirable properties. For example, in embodiments including inorganic particles only in the innermost layer of a multi-layer polyurethane coating, it has been discovered that the resulting fertilizer particles can exhibit an advantageous nutrient release profile which has reduced rates of fertilizer availability compared to alternative fertilizer particles which have inorganic particles only in outermost layers or no inorganic particles. As can be appreciated, the inorganic particles can be applied to any possible combination of polyurethane coating layers (e.g., the innermost coating layer and the outermost coating layer, the 2 innermost coating layers, the 2 innermost coating layers and the outermost coating layer, certain intermediate layers, etc.).

In certain embodiments, the inorganic particles can also, or alternatively, be applied to the polyurethane coating after polymerization of the polyols and the isocyanate curing agent has already started. Such application of the inorganic particles can reduce the polymerization time and avoid any agglomeration concerns caused by incomplete curing or drying of the polyurethane coating. In certain embodiments, addition of inorganic particles can reduce the polymerization time from about 30 to 60 minutes to about 10 to 20 minutes or less. As can be appreciated, inclusion of higher amounts of a curing agent or catalyst can be used to reduce the polymerization time.

Suitable polyols for the formation of a polyurethane coating can include hydrophobic polyols including aromatic amine-based polyols and polyether polyols (e.g., ethylene oxide polyols and propylene oxide polyols).

In certain embodiments, suitable polyols can be blends of aromatic amine-based polyols having alkylene oxide substituents such as ethylene oxide, propylene oxide, butylene oxide, amylene oxide, alkylene oxide-tetrahydrofuran mixtures, epihalohydrins, and alkylene styrene. For example, suitable aromatic amine-based polyols can generally be derived from the aromatic amine depicted in Formula I:

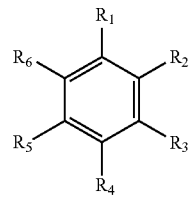

Formula I wherein $R_1$ includes one of an alkyl group, an amine group, and a hydrogen and each of $R_2$ to $R_6$ independently includes one of an amine group and a hydrogen and wherein at least one of $R_1$ to $R_6$ is an amine group. Suitable aromatic amine-based polyols can have an OH number from 300 to 600 and a nominal functionality from 1 to 7 in certain embodiments. Suitable aromatic amine-based polyols can be formed from aromatic amines in any suitable manner.

Suitable polyether polyols can generally be selected from known organic oxides such as ethylene oxide, propylene oxide, 1,2-butylene oxide, and epichlorohydrin.

Suitable polyols can also be commercially obtained. For example, suitable aromatic amine-based polyols and polyether polyols are sold under the tradename Pluracol® and are available from the BASF Corporation (Wyandotte, Mich.). Additional examples of suitable polyols are described in U.S. Pat. No. 7,416,785, the disclosure of which is hereby incorporated herein by reference.

As can be appreciated, the polyols described herein can form a polyurethane coating layer when reacted with an appropriate curing agent such as, for example, an isocyanate curing agent. Generally, such polyols and isocyanate curing agents can be mixed at an approximately 1:5 ratio, at an approximately 1:4.5 ratio, at an approximately 1:4 ratio, at an approximately 1:3 ratio, at an approximately 1:2 ratio, or at an approximately 1:1 ratio to form the polyurethane coating layers according to various embodiments. As can be appreciated, increasing the amount of the curing agent can increase the amount of polyurethane crosslinking and increase the mechanical strength of the polyurethane coating. The rate of the polymerization reaction can vary depending upon, for example, the amount of polyol, the amount of the curing agent, and the amount of the catalyst, if any, used to form the coating. In certain embodiments, it can be advantageous to select polyols and isocyanate curing agents which are miscible with one another. As can be appreciated, miscibility can facilitate manufacturing and can reduce, or eliminate, any unreacted components, and reduce the reaction time necessary to form the polyurethane coating. In certain embodiments, miscible polyols and isocyanate agents can be applied separately to a granule as a result of their miscibility.

A large variety of isocyanate curing agents can be suitable for the formation of the controlled-release fertilizer compositions described herein. For example, suitable isocyanate curing agents can include aliphatic isocyanates, aromatic isocyanates, heterocyclic isocyanates, and oligomers or polymers thereof. In certain embodiments, suitable isocyanate curing agents can have two or more isocyanate groups per molecule.

In certain embodiments, it can be useful for the isocyanate curing agent to be chemically related to the selected polyols so as to facilitate, for example, compatibility and miscibility with the selected polyol with the isocyanate curing agent. In certain such embodiments, suitable isocyanate curing agents can be an aromatic amine-based isocyanate such as a toluene-derived isocyanate curing agent. As can be appreciated, suitable isocyanate curing agents can also be commercially obtained and can include isocyanate curing agents sold under the tradename Lupranate®. Lupranate® isocyanate curing agents are available from the BASF Corporation (Wyandotte, Mich.).

Generally, the polyols and isocyanate curing agents described herein can be used to encapsulate any desirable type of granule to control the rate at which the fertilizer components in the granule are made available to desired soil and vegetation. Suitable granules which can be encapsulated by the polyols and isocyanate curing agents described herein can vary widely and can include, for example, nitrogen fertilizer compounds, phosphate fertilizer compounds, potash fertilizer compounds, sulfur fertilizer compounds, potassium fertilizer compounds, calcium fertilizer compounds, various metal fertilizer compounds, micro-nutrients, and combinations thereof. In certain embodiments, the granules can include nitrogen-based fertilizers such as urea, ammonium nitrate, or calcium ammonium nitrate. Additionally, or alternatively, granules as described herein can include any other materials which can be beneficial to soil or vegetation including other NPK fertilizers. For example, suitable granules can further include herbicides, insecticides, fungicides, and fragrances.

Examples of suitable granules can include fertilizer granules such as potassium nitrate, potassium sulfate, urea, ammonium nitrate, monopotassium sulfate, ammonium phosphate, fertilizers containing micronutrients or trace elements, and urea formaldehyde fertilizers. Further details of urea formaldehyde fertilizers are disclosed in U.S. Pat. Nos. 6,039,781 and 6,579,831 each of which is incorporated herein by reference.

In certain embodiments, granules can also, or alternatively, be inert materials such as corncobs, peanut hulls, processed paper pulp, sawdust, agglomerated cellulosic carrier granules, wood fiber core granules, compressed coir granules, processed paper pulp, limestone, gypsum, sand, vermiculite, perlite, fuller's earth and clays (e.g., attapulgite clays, bentonite clays, and montmorillonite clays). In certain embodiments, inert granules can include characteristics that can allow the granules to be more absorbent. For example, granules containing a processed paper pulp (e.g., biodac) can absorb more liquid than dolomitic limestone. In certain embodiments, inert granules can include additives that can enhance the biological function of the granules. For example, the granules can include an agglomeration of dispersed particles or fines that have the property of increased hardness or crush resistance as described in PCT/US12/32596 which is hereby incorporated herein by reference. Such granules are well known to a person of ordinary skill in the art.

According to certain embodiments, the process of coating a granule can include application of the selected polyol to the granule to be encapsulated followed by application of the inorganic particles and the isocyanate curing agent. For example, a polyol mixture can be applied to the granule followed by application of the inorganic particles. Once the inorganic particles are applied, the isocyanate curing agent can be applied to form a polyurethane coating layer substantially entirely surrounding the granule. The inclusion of the inorganic particles in the polyol before application of the isocyanate curing agent can minimize any difficulties caused by the inclusion of the inorganic particles. Alternatively, an isocyanate curing agent can be applied to the granule followed by application of the inorganic particle. Once the inorganic particle is applied, the polyol can be applied to form a polyurethane coating layer.

Generally, the polyol mixture and the isocyanate curing agent can be applied in an approximately 1:1 ratio, by weight. In other embodiments, other ratios can alternatively be selected. In certain embodiments, more than one coating layer can be sequentially applied. For example, in certain embodiments, two, three, four, or even more coating layers can be applied to encapsulate a granule and form the coated fertilizer particle. The inorganic particles can be included in each layer or only certain layers. Generally, the selected polyol, inorganic particles, and isocyanate curing agent can be applied using any suitable coating process including, for example, spray coating, roll coating, dip coating, and any other known coating process.

In certain embodiments, the controlled-release fertilizer compositions described herein can be formed by roll coating of urea. In such embodiments, urea can be heated to a temperature of about 170° F. in a rotary drum. Once heated, the selected polyol or polyol-blend can be applied and allowed to coat the urea granules. Subsequently, the inorganic particles can be dispersed onto the granules. Finally, isocyanate curing agent can be applied and allowed to react with the polyols to form a polyurethane coating layer. Additional polyurethane coating layers can be similarly formed.

In certain embodiments, the coated granules can be heated for an additional period of time to ensure that polymerization is complete. For example, in certain embodiments, the coated granules can be held at about 170° F. for 30 to 60 minutes to ensure complete polymerization of the polyurethane layers. In certain embodiments, inorganic particles can be dispersed over the coated granules during this additional period of time. In such embodiments, the coated granules can be heated for only about 5 to 20 minutes.

As can be appreciated, alternative processes can also be suitable. For example, the selected polyol and the inorganic particles can be premixed before application to the granule. Alternatively, the inorganic particles can be premixed with the isocyanate curing agent. In certain embodiments, the polyol, inorganic particles, and the isocyanate curing agent can each be premixed together before application to the granules.

As can be appreciated, a variety of optional components can further be included in various embodiments. For example, a catalyst can be included in certain embodiments to accelerate the polymerization reaction between the selected polyol and the isocyanate curing agent. In certain such embodiments, a catalyst can be included at about 0.5% to about 5%, 0.75% to about 3%, or about 1% to about 2%, by weight of the polyol. Suitable catalysts can include amine-based catalysts such as triethanolamine, trimethyl amine, triethyl amine, tetraethylene diamine, 1,8-diazabicyclo[5.4.0]undec-7-ene ("DBU"), 1,5-diazabicyclo[4.3.0]non-5-ene ("DBN"), dimethylethyl amine and dimethylisopropyl amine. Alternatively, suitable catalysts can be a metal salt catalyst such as ferric acetylacetonate and dibutyltin dilaurate ("DBTL"). In certain such embodiments, ferric acetylacetonate can be included at about 50 parts-per-million ("ppm") to about 1,000 ppm, about 100 ppm to about 750 ppm, or about 200 ppm to about 500 ppm, of the polyol.

As can be appreciated, still other optional components can be further included in the controlled-release fertilizer compositions, in the granule and/or in the coating layers. For example, drying agents such as calcium sulfate can be used to remove water before an encapsulation step or to help the granules reduce agglomeration. Additionally, colorants can be included to facilitate easy identification of the controlled-release fertilizer compositions.

In certain embodiments, a wax can be applied to the outside of coated fertilizer particles to provide additional water resistance to the controlled-release fertilizer compositions. In such embodiments, coated fertilizer particles can be heated to a suitable temperature (e.g., about 70° C.) and then coated with a molten wax and tumbled to evenly coat the wax over the coated fertilizer particles. In certain embodiments however, a wax coating can be omitted based on the strength of the polyurethane coatings formed herein.

As can be appreciated, the release profile of a coated fertilizer particle can depend on a variety of different factors. For example, the rate at which the fertilizer present in a granule is released into the desired soil and vegetation can depend on the physical durability and the water permeability of the encapsulating material and the overall coating weight (e.g., thickness and number of polyurethane coating layers) of the coating material. It has been discovered that inclusion of small quantities of inorganic particles can improve the physical durability and lower the water permeability of the encapsulating materials. More durable encapsulating materials can facilitate the formation of a controlled-release fertilizer composition having superior handling characteristics.

Controlled-release fertilizer compositions having lower coating weights can be extremely beneficial. A lower coating weight can mean that a controlled-release fertilizer composition can include more fertilizer for a given weight and/or volume of the fertilizer composition. Additionally, reduction of the coating weight can, in certain embodiments, simplify production of the controlled-release fertilizer composition by allowing fewer coatings to be applied to the granules reducing the expenditure of time, materials, and energy. Further, reduction of the coating weight can also reduce the amount of polymer spent in the field. As can be appreciated, each coating applied around a fertilizer particle can increase both the time and difficulty of the production process.

As can be appreciated, the controlled-release fertilizer compositions described herein can be blended with additional fertilizer compounds. For example, additional slow-release nitrogen compounds such as triazones, urea-triazones (such as tetrahydro-s-triazone or 5-methyleneuriedo-2-oxohexahydro-s-triazine), methylene urea products, and isobutylidene-diurea ("IBDU") can be blended with the coated fertilizer particles to further tailor the nitrogen release profile over time. The addition of such fertilizer compounds can also allow the controlled-release fertilizer compositions to include any suitable amount of nitrogen. For example, in certain embodiments, the controlled-release fertilizer compositions can include from about 1% to about 99%, by weight, nitrogen. In certain embodiments, the fertilizer compositions can include from about 20% to about 70%, by weight, nitrogen including, for example, from about 20% to about 50%, by weight, nitrogen. In various embodiments, the amount, by weight, of nitrogen in a fertilizer composition can be about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 99%.

Additionally, or alternatively, various types of fast-release nitrogen compounds can be blended with the controlled-release fertilizer compositions. Examples of suitable fast-release nitrogen compounds can include one or more of urea, urea ammonium sulfate ("UAS"), ammonium sulfate.

In certain embodiments, the controlled-release fertilizer compositions described herein can further be mixed with one or more non-encapsulated components. For example, the fertilizer compositions can be mixed with non-encapsulated phosphorus, potassium, calcium, magnesium, manganese, molybdenum, sulfur, or zinc.

The controlled-release fertilizer compositions described herein can be applied to a seed, seedling, plant, or lawn by sprinkling, or spreading (for example, with a mechanical spreader), the composition onto the soil, seed, seedling, plant, lawn, farm, crops, or other agricultural environment.

In certain embodiments, a fertilizer composition described herein can be applied in amounts of from about 0.1 lb. of nitrogen per 1000 $ft^2$ to about 6 lbs. of nitrogen per 1000 $ft^2$. In certain embodiments, the fertilizer compositions can be formulated as a ready-to-use or ready-to-spray formulation.

EXAMPLES

The following examples are included to illustrate certain aspects and embodiments of the present disclosure, and are not intended to limit the disclosure to these described embodiments.

Each of the examples was prepared in accordance to the following procedure. 1000 g of granular urea was charged into a rotary drum heated to 170° F. When the granular urea reached 170° F., 2.2 g of Dustrol® 3088 was evenly dispensed over the charged granules while heating and rotating the drum coater. Dustrol® 2088 is a dust control additive. This process was continued for three minutes. Depending on desired polymer thickness, 4.5 phr of a mixture of Pluracol® 1500 and Pluracol® 1578 (w/w)—polyol, was dispensed onto the granules coated with Dustrol® 3088. Tumbling and heating was continued for another a minute. HiSil 233 (0.25 g), an amorphous silica inorganic particle blend, was spread evenly over the granules in the drum and tumbling was continued for two more minutes. Lupranate® M20 (4.5 g), an isocyanate curing agent, was then charged into the drum and spread evenly over the entire bed of granules. The combination of HiSil 233, polyol and isocyanate formed one polyurethane layer. The layering was repeated until the total desired polymer coat weight is achieved. The coating was then heated for an additional 30 minutes to 60 minutes to ensure that the reaction was complete. This also eliminated bag set upon storage.

In certain examples, HiSil 233 was added only to one or more of the individual polymer layers. For example, Dustrol® 3088, HiSil 233, polyol and isocyanate curing agent could be dispensed sequentially to form the first layer. The second and subsequent polymer layers could then include polyol and isocyanate without HiSil 233. As can be appreciated, the inorganic particles (HiSil 233) can be incorporated into layer 2 to layer n (where layer n represents the final polymer layer needed to achieve a coating of specific thickness).

In other examples, HiSil 233 was added to the bed of coated granules 10-20 minutes after the final polymer layer was added. Total cycle time of such a coating process was reduced from 30-60 minutes to the 10-20 minutes illustrated above.

In certain examples, a wax coating was applied. In such examples, polymer coated granules were transferred to a heated secondary rotary drum coater (160° F.) where molten wax (8.8 g of Evacote® 7089A) per 1000 g of polymer coated granules is dispensed evenly across the bed of granules. Wax coating is continued for three minutes and cooled to 100° F. or less before discharge.

Nutrient release profiles of various fertilizer compositions were determined by adding 10 g of a fertilizer composition to a jar with 100 g of deionized water maintained at room temperature (e.g., about 22° C.) and sealing the jar. The jar was rolled daily to disperse any released nitrogen evenly throughout the water. Aliquots of water were removed at measured intervals to determine the quantity of nitrogen released from the fertilizer composition. The nutrient release profiles indicate the rate at which nutrients of the fertilizer composition are released into soil.

Table 1 depicts the nutrient release profiles of several example fertilizer compositions formed from the encapsulation of urea granules. The urea granules were encapsulated with varying coat weights of polyurethane formed from a 50/50 blend of Pluracol® 1500 and Pluracol® 1578 from the BASF Corporation (Wyandotte, Mich.) with equal amounts of Lupranate® M20 also from the BASF Corporation. Each example fertilizer composition included 4 layers of polyurethane. Lupranate® M20 is a modified 4,4'-methylene diphenyl isocyanate having a functionality of about 2.7.

Examples 1 and 2 are Comparative Examples because they do not contain inorganic particles. Example 1 has a total coat weight of 4.3% while Example 2 has a total coat weight of 9.6%. Inventive Example 3 includes 0.2%, by weight of the inorganic particle, Hi-Sil 233 from PPG Industries Inc. (Monroeville, Pa.). Half of the Hi-Sil 233 was equally dispersed in each of the 4 polyurethane coating layers.

TABLE 1

| Water Soak Time (days) | Example 1 (% N released) | Example 2 (% N released) | Example 3 (% N released) |
|---|---|---|---|
| 0 | 0 | 0 | 0 |
| 1 | 0 | 0 | 0 |
| 7 | 2 | 2 | 1 |
| 14 | 7 | 3 | 2 |
| 21 | 14 | 4 | 3 |
| 28 | 26 | — | 3 |
| 42 | 44 | 7 | 5 |
| 70 | 69 | 17 | — |
| 77 | — | — | 14 |

As depicted by Table 1, Example 3 had a substantially slower nutrient release profile than either of Comparative Examples 1 and 2 despite having a total coat weight of only 4.5%.

Abrasion resistance was also measured for the example fertilizer compositions. Abrasion resistance was characterized by mixing 100 g of the Example fertilizer composition in a tin can with stainless steel ball bearings. The sealed tin can was then placed in a paint shaker (Tornado II Portable Paint Shaker, Model 51000) at a constant frequency for one minute. Nutrient release values for the examples were then measured in accordance to the nutrient release profiles of Table 1. Examples 1 and 3 from Table 1 were evaluated.

TABLE 2

| Water Soak Time (days) | Example 1 (% N released) | Example 3 (% N released) |
|---|---|---|
| 0 | 0 | 0 |
| 1 | 14 | 6 |
| 7 | 36 | 24 |
| 14 | 51 | 32 |
| 21 | 60 | 38 |
| 28 | 67 | 42 |

As indicated by Table 2, the inclusion of amorphous silica at just 0.2% substantially improved the abrasion resistance of the polyurethane coatings. These results indicate that polyurethane coatings including inorganic particles can be significantly more resistant to abrasion damage.

Table 3 evaluated the effects of including inorganic particles in only one polyurethane layer of a three-layer polyurethane coating. Each example fertilizer composition had a total coat weight of 2.7% and was formed of similar components as Examples 1 to 3. Example 4 did not include Hi-Sil 233, Example 5 included Hi-Sil 233 in the innermost layer, Example 6 included Hi-Sil 233 in the middle layer, and Example 7 included Hi-SE 233 in the outermost layer.

TABLE 3

| Water Soak Time (days) | Example 4 (% N released) | Example 5 (% N released) | Example 6 (% N released) | Example 7 (% N released) |
|---|---|---|---|---|
| 0 | 0 | 0 | 0 | 0 |
| 1 | 42 | 9 | 11 | 15 |
| 7 | 77 | 30 | 36 | 47 |
| 14 | 93 | 40 | 49 | 60 |
| 21 | 99 | 46 | 57 | 68 |
| 28 | 100 | 52 | 63 | 72 |

Table 3 confirms the inclusion of inorganic particles in any polyurethane layer reduces the nutrient release profile of a fertilizer composition compared to a fertilizer composition free of the inorganic particles. Table 3 also indicates that inorganic particles are most beneficially located in the innermost layers.

As used herein, all percentages (%) are percent by weight of the total composition, also expressed as weight/weight %, % (w/w), w/w, w/w % or simply %, unless otherwise indicated.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A controlled-release fertilizer composition comprising:
    coated fertilizer particles each comprising a granule and one or more polyurethane coating layers, wherein the one or more polyurethane coating layers substantially encapsulate the granule; and
    wherein the one or more polyurethane coating layers are formed from the reaction product of a hydrophobic aromatic amine polyol composition and an isocyanate curing agent; and
    wherein at least one of the one or more polyurethane coating layers comprises inorganic particles.

2. The controlled-release fertilizer composition according to claim 1, wherein the coated fertilizer particles comprises two or more polyurethane coating layers, and wherein the innermost of the two or more polyurethane coating layers includes the inorganic particles.

3. The controlled-release fertilizer composition according to claim 1, wherein the inorganic particles comprise one or more of amorphous silica, clay, fumed silica, calcium carbonate, quartz, aluminum oxide, mica, calcined kaolin, wollastonite, calcite, zirconia, zircon, micaceous iron oxide, iron oxide, aluminum silicates, talc, barium sulfate, or lithopone.

4. The controlled-release fertilizer composition according to claim 1, wherein the coated fertilizer particles comprise one or more of a nitrogen compound, a phosphate fertilizer compound, a potash fertilizer compound, a sulfur fertilizer compound, a potassium fertilizer compound, a calcium fertilizer compound, or a metal compound.

5. The controlled-release fertilizer composition according to claim 1, wherein the coated fertilizer particles comprise urea.

6. The controlled-release fertilizer composition according to any claim 1 wherein the coated fertilizer particles further comprise one or more of an herbicide, an insecticide, or a fungicide.

7. The controlled-release fertilizer composition according to claim 1, wherein the coated fertilizer particles comprise about 1% to about 15%, by weight, of the one or more polyurethane coating layers.

8. The controlled-release fertilizer composition according to claim 1, wherein the coated fertilizer particles comprises four polyurethane coating layers.

9. The controlled-release fertilizer composition according to claim 1, wherein the coated fertilizer particles further comprises a wax coating layer surrounding the one or more polyurethane coating layers.

10. The controlled-release fertilizer composition according to claim 1, wherein the aromatic amine polyol composition comprises alkylene oxide substituents and wherein the aromatic amine polyol composition further comprises a polyether polyol.

11. The controlled-release fertilizer composition according to claim 10, wherein the alkylene oxide substituents comprise one or more of ethylene oxide and propylene oxide and wherein the polyether polyol comprises one or more of an ethylene oxide polyol or a propylene oxide polyol.

12. The controlled-release fertilizer composition according to claim 1, wherein the isocyanate curing agent comprises one or more of a polymeric isocyanate, an aromatic isocyanate, or 4,4'-methylene diphenyl isocyanate.

13. The controlled-release fertilizer composition according to claim 1, wherein the ratio of the polyol composition to the isocyanate curing agent is about 1:4 to about 1:1.

14. The controlled-release fertilizer composition according to claim 1, wherein the one or more polyurethane coating layers comprise a catalyst selected from one of an amine-based catalyst or a metal salt catalyst.

15. The controlled-release fertilizer composition according to claim 1 has a nutrient release profile of about 30 days or greater.

16. A method of fertilizing comprising applying the controlled-release fertilizer composition according to claim 1 to soil.

17. A method of making a controlled-release fertilizer composition comprising:
    coating granules with a hydrophobic aromatic amine polyol composition;
    dispersing inorganic particles onto the polyol composition; and
    applying an isocyanate curing agent to the polyol composition to form a polyurethane coating layer substantially encapsulating each granule; and
    wherein the polyol composition is miscible with the isocyanate curing agent.

18. The method according to claim 17, further comprising the formation of one or more additional polyurethane coating layers to substantially encapsulate each granule.

19. The method according to claim 17, wherein at least one of the one or more additional polyurethane coating layers includes inorganic particles.

20. The method according to claim 17, wherein the polyol composition and the isocyanate curing agent are included in about a 1:4 ratio to about a 1:1 ratio.

* * * * *